(No Model.)
J. E. A. GIBBS.
VELOCIPEDE.
No. 501,712. Patented July 18, 1893.
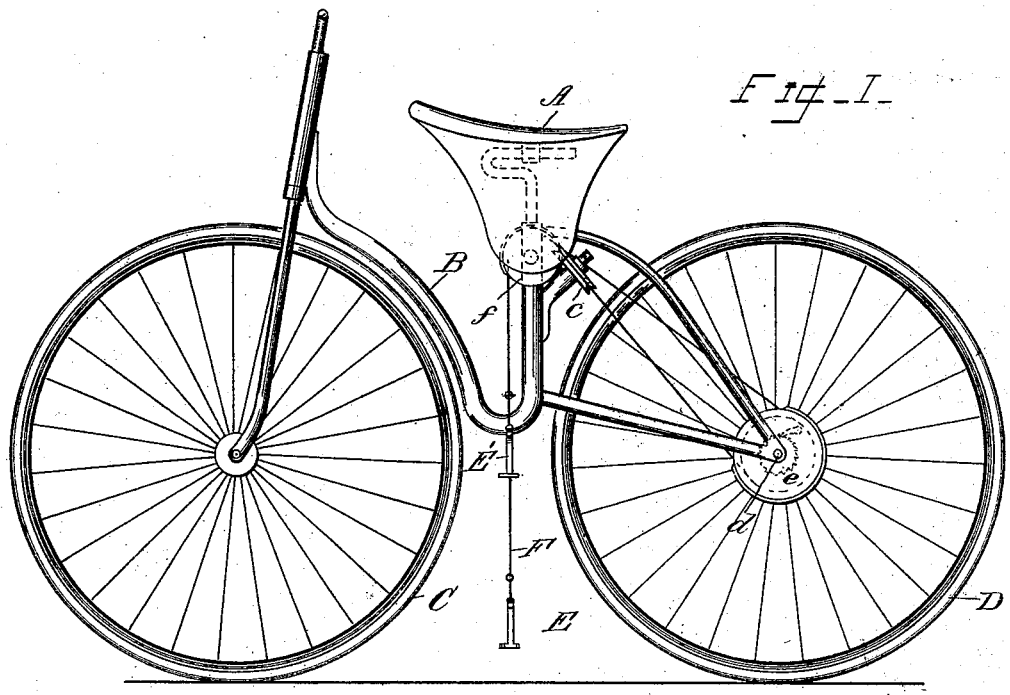
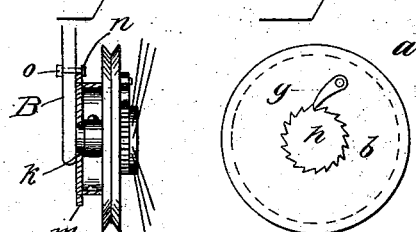 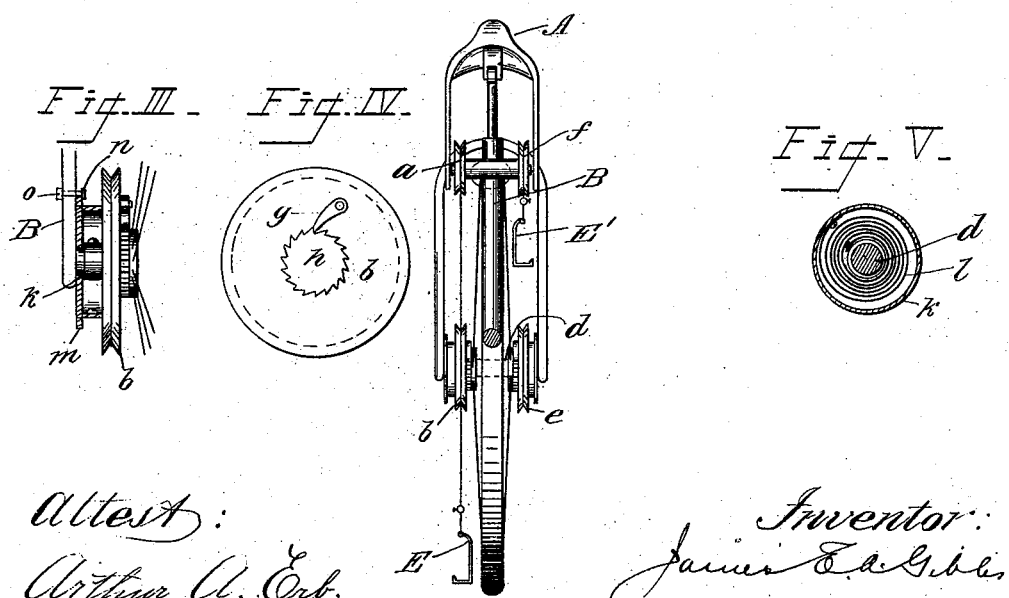 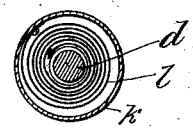
Attest:
Arthur A. Erb.
Reeves Lewis.
Inventor:
James E. A. Gibbs
by Poler & Mauro
his attorneys

UNITED STATES PATENT OFFICE.

JAMES E. A. GIBBS, OF RAPHINE, VIRGINIA.

VELOCIPEDE.

SPECIFICATION forming part of Letters Patent No. 501,712, dated July 18, 1893.

its resistance is substantially uniform during the entire stroke, and its pull substantially uniform during the entire return. The advantage of this is obvious. For the purpose of regulating the tension of the spring so that it may be adjusted to do the required work without offering a greater resistance than necessary to the stroke of the rider's foot, the cup $k$ is provided on the side adjacent to the frame with a flange $m$, which is clamped by a bolt $n$ and nut $o$ to the frame, holding the cup stationary. By loosening nut $o$ the cup $k$ can be turned in either direction to tighten or relax the spring, as may be required.

When the construction of the driving gear is such as shown in Fig. II, the feet can be moved alternately or simultaneously, as desired, and in either form of the invention the feet have, in coasting a stationary support.

It is obvious that modifications in details of construction may be made without departing from the spirit of the invention.

Having thus described my invention, what I claim as new, and desire to secure by Letters Patent, is—

1. The combination with the driving wheel of a velocipede, of driving gear comprising flexible cords or belts connected at one end with a driving pulley on the main-axle, guide pulleys over which said cords or belts are led, and stirrups suspended from the ends of said cords or belts and free to swing in any direction, substantially as described.

2. The combination of the driving pulleys, each having a detachable connection with the main axle, a driving cord or belt for each pulley, a stirrup freely suspended at one end of each cord or belt, and a coiled spring for raising the stirrup, substantially as described.

In testimony whereof I have signed this specification in the presence of two subscribing witnesses.

JAS. E. A. GIBBS.

Witnesses:
PHILIP MAURO,
REEVE LEWIS.